United States Patent
Kohno

Patent Number: 5,836,145
Date of Patent: Nov. 17, 1998

[54] TIRE CORD HAVING A CORE AND SHEATH WITH IMPROVED RUBBER PENETRATION

[75] Inventor: Masatsugu Kohno, Kobe, Japan

[73] Assignee: Sumitomo Rubber Industries, Ltd., Hyogo-ken, Japan

[21] Appl. No.: 549,314

[22] Filed: Oct. 27, 1995

[30] Foreign Application Priority Data

Oct. 28, 1994 [JP] Japan .................................. 6-289199
Nov. 24, 1994 [JP] Japan .................................. 6-315874

[51] Int. Cl.$^6$ ....................................................... D02G 3/36
[52] U.S. Cl. ................................ 57/213; 57/223; 57/902
[58] Field of Search .......................... 57/902, 212, 213, 57/222

[56] References Cited

U.S. PATENT DOCUMENTS

| | | | |
|---|---|---|---|
| 4,158,946 | 6/1979 | Bourgois | 57/213 |
| 4,572,264 | 2/1986 | Umezawa et al. | 57/902 |
| 4,628,683 | 12/1986 | Bourgois et al. | 57/902 |
| 4,763,466 | 8/1988 | Abe et al. | 57/213 |
| 4,986,327 | 1/1991 | Takahira | 57/212 |
| 5,236,029 | 8/1993 | Nakashio et al. | 152/451 |
| 5,285,836 | 2/1994 | Kawamura | 57/902 |
| 5,410,868 | 5/1995 | Sakon | 57/902 |

FOREIGN PATENT DOCUMENTS

| | | |
|---|---|---|
| 0 488735 | 11/1991 | European Pat. Off. . |
| 0 497612 | 1/1992 | European Pat. Off. . |
| 0 560564 | 3/1993 | European Pat. Off. . |
| 61-119403 | 6/1986 | Japan . |

OTHER PUBLICATIONS

"Micro–Alloyed Steel Cord Constructions for Tyres", Research Disclosure, No. 349, pp. 333–334 (1993).

*Primary Examiner*—William Stryjewski
*Attorney, Agent, or Firm*—Birch, Stewart, Kolasch & Birch, LLP

[57] ABSTRACT

A tire cord which is improved in penetration of rubber into the cord and the fatigue resistance without increasing the diameter of the cord. The tire cord comprises a core and an inner sheath, the core consisting of three steel filaments twisted together, the inner sheath consisting of seven to nine steel filaments twisted around the core in the same direction as the core twist, the twist pitch length of the inner sheath being in the range of from 1.05 to 1.50 times the twist pitch length of the core, the diameter of the core filaments being in the range of from 0.8 to 1.0 times the diameter of the inner sheath filaments.

4 Claims, 5 Drawing Sheets

TIRE CORD HAVING A CORE AND SHEATH WITH IMPROVED RUBBER PENETRATION

The present invention relates to a tire cord, which is improved in penetration of rubber into the cord and the fatigue resistance without increasing the diameter of the cord.

BACKGROUND OF THE INVENTION

For a steel cord for used in a tire, the following are very important.

(1) To decrease the cord diameter.

In order to reduce the weight of a tire, the thickness of cord reinforced layers, e.g. a carcass, belt, bead filler and the like must be decreased, and accordingly it is necessary to decrease the cord diameter.

(2) To increase the cord strength.

If the strength of a cord is high although the diameter of the cord is small, the tire weight reduction can be further promoted.

(3) To improve the production efficiency.

If the cord structure is simpler, the production cost is lower.

(4) To improve the stability of the twist structure.

In order to improve the rubber penetration, a cord made of a waved filament and a straight filament has been proposed. However, as the waved filament is longer than the straight filament, the load concentrates on the straight filament, and the cord strength often decreases.

(5) To improve the fatigue resistance.

If fretting of the elementary steel filaments is caused during use, the strength of a steel cord is decreased. Incidentally, the fretting is a phenomenon such that the directly contacting filaments are abraded by repeated relative movements therebetween.

In the order of a regular twist cord, a layer twist cord and a bunched twist cord, the fretting becomes small, and therefore, the fatigue resistance becomes high.

(6) To improve penetration of rubber into the cord.

If a steel cord has a space extending in the longitudinal direction of the cord and not filled with a rubber compound, moisture passes through the space, and the steel filaments are liable to rust.

Here, the regular twist cord is the one made of strands twisted together in a direction, each strand consisting of filaments twisted together in the opposite direction. The layer twist cord is the one made of a core consisting of filaments or strands twisted together in a direction, and a sheath comprising filaments or strands twisted around the core in the opposite direction. In general, the twist pitch length of the sheath is about 1.6 to 2.3 times the twist pitch length of the core.

The bunched twist cord is the one made of a number of filaments twisted in the same direction and a wrapping wire wound in the opposite direction.

The bunched twist cord is able to satisfy the above-mentioned requirements (1)–(5), but is inferior in the rubber penetration—Requirement (6).

It is therefore, an object of the present invention to provide a tire cord which is improved in rubber penetration while satisfying the above-mentioned requirements (1)–(5) as a bunched twist cord.

SUMMARY OF THE INVENTION

According to one aspect of the present invention, a tire cord comprises a core and a sheath, the core consisting of three steel filaments twisted together, the sheath comprising seven to nine steel filaments twisted around the core in the same direction as the twist of the core, the twist pitch length of the sheath being in the range of from 1.05 to 1.50 times the twist pitch length of the core, the diameter of the core filaments being in the range of from 0.8 to 1.0 times the diameter of the sheath filaments.

Preferably, there is no wrapping wire outside the sheath.

BRIEF DESCRIPTION OF THE DRAWINGS

Embodiments of the present invention will now be described in detail in conjunction with the accompanying drawings.

DETAILED DESCRIPTION OF THE EMBODIMENT

Figure 1:
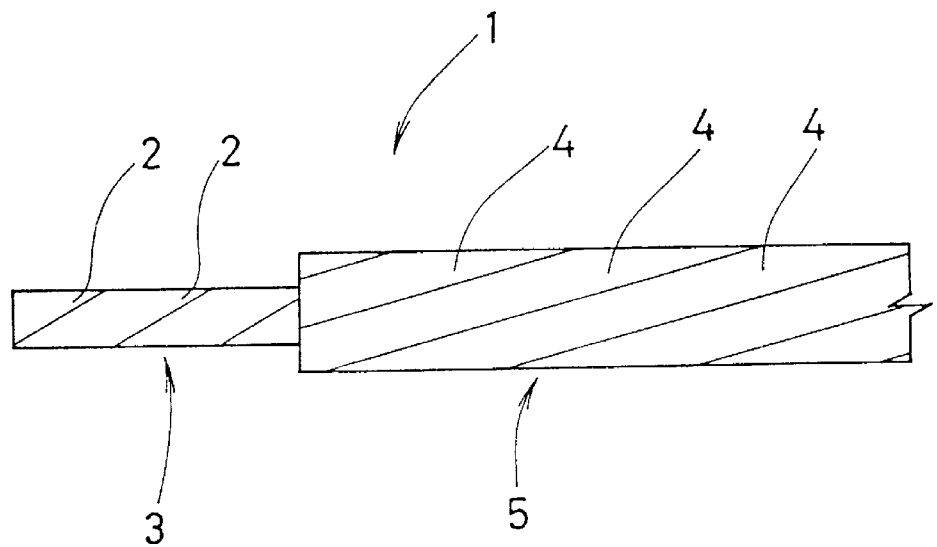
FIG. 1 is a schematic plan view of an embodiment of the present invention.

In FIGS. 1–3(D), a tire cord 1 according to the present invention comprises a core 3 consisting of three core filaments 2 twisted together and a sheath 5 consisting of seven to nine sheath filaments 4 twisted around the core 3.

Each of the core filaments 2 and sheath filaments 4 is a single steel filament or wire made by drawing.

The diameter DC of the core filaments 2 is in the range of from 0.8 to 1.0 times the diameter DS of the sheath filaments 4.

The diameters DC and DS are in the range of from 0.20 to 0.40 mm.

Figure 2:
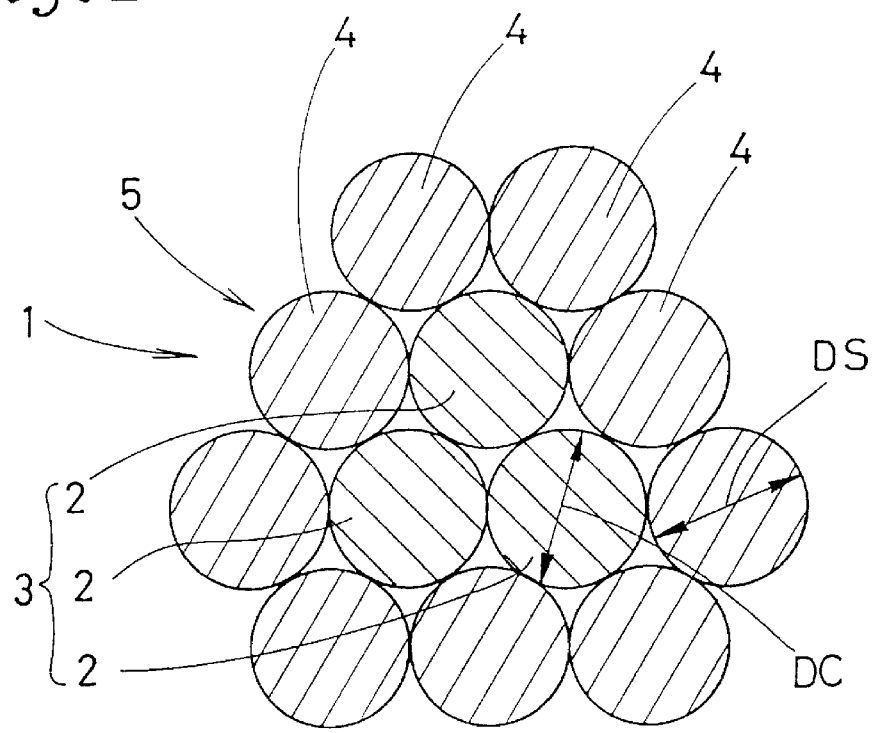
FIG. 2 is a cross sectional view of the embodiment of FIG. 1.
Figure 3A:
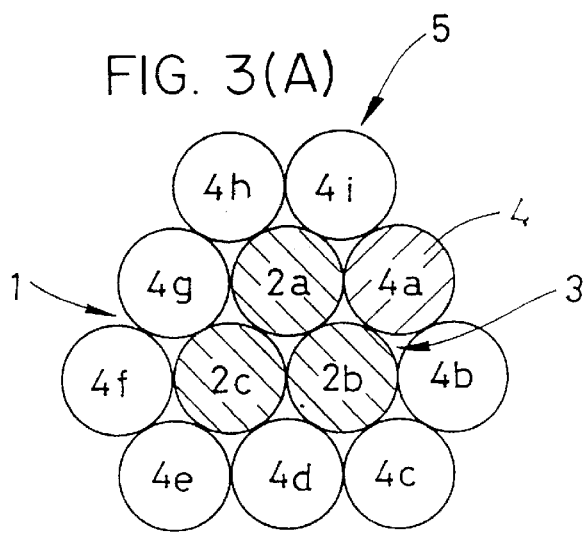
FIG. 3(A) through (D) show cross sectional views thereof taken at different positions in the longitudinal direction of the cord to show the shift of the sheath filaments relative to the core filaments.
Figure 3B:
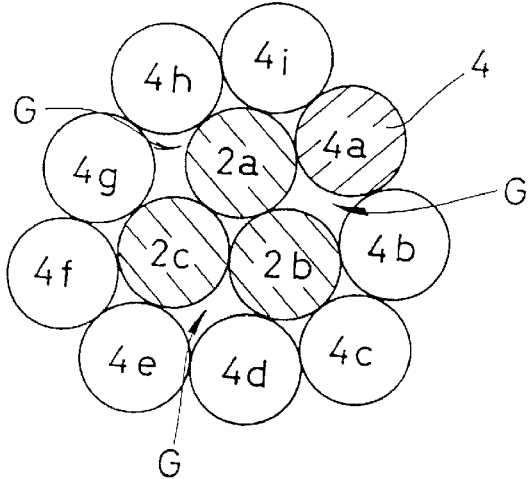
Figure 3C:
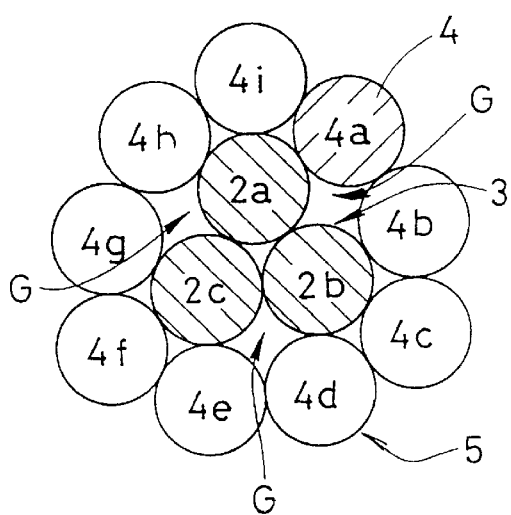
Figure 3D:
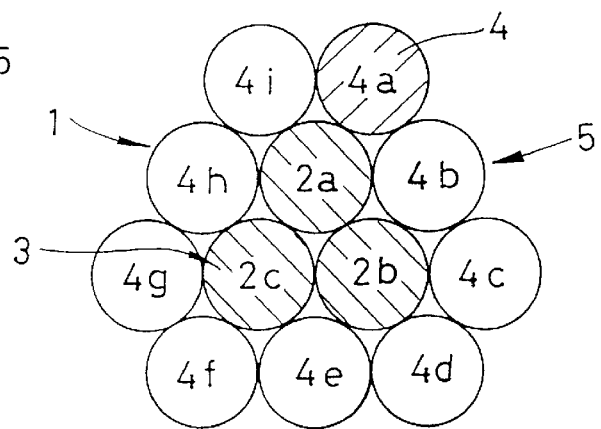

In the example shown in FIGS. 1 and 2, the diameter DC is equal to the diameter DS, and the sheath 5 is made of nine sheath filaments 4. The sheath filaments 4 in the cord are the same length. A wrapping wire is not provided.

The twist direction of the sheath filaments is the same as the twist direction of the core filaments 2.

The twist pitch length PS of the sheath 5 is in the range of from 1.05 to 1.50 times the twist pitch length PC of the core 3.

Between the twist pitch length PS and the twist pitch length PC, a small difference is provided. Therefore, the sheath 5 rotates relative to the core 3 along the longitudinal direction of the cord. Accordingly, as shown in FIGS. 3(A)–(D), between stable portions (A) and (D), unstable portions (C)–(D) are formed at regular intervals.

In the stable portions as shown in FIG. 2 and (A and D) in FIGS. 3(A)–(D), the core filaments 2 and the sheath filaments 4 are compactly bundled to form a structure very close to a bundled twist cord. Therefore, the diameter of the cord is minimized, and the strength per diameter is improved. As a result, the cord count in a tire reinforcing layer can be decreased and the tire weight can be reduced.

In the unstable portions, gaps G through which topping rubber penetrates into the cord are easily formed, and the rubber penetration is improved to shut off the spaces between the filaments from the spread of moisture. Therefore, the steel filaments can be prevented from rusting. Further, the adhesion between the core and sheath is improved to prevent the core from coming out the sheath and therefore, the durability of the cord can be improved.

Further, as the twist pitch length PS of the sheath 5 and the twist pitch length PC of the core 5 satisfy the above-mentioned limitation, the sheath filaments 4 and core filaments 2 in the cord have the almost same length, and the load is evenly distributed to all the filaments. Therefore, the breaking strength of the cord is further improved. Furthermore, as the cord structure is very simple, the structural stability, and production efficiency and cost can be improved.

If the twist pitch length of the sheath is less than 1.05 times the twist pitch length of the core, the cord breaking strength decreases. If more than 1.50 times, the fatigue resistance is deteriorated.

If the diameter of the core filaments is more than 1.0 times the diameter of the sheath filaments, the cord weight per cord diameter increases. If the diameter of the core filaments is less than 0.8 times the diameter of the sheath filaments, the fretting is liable to occur on the core filaments to decrease the fatigue resistance of the cord, and the cord strength remarkably decreases.

When no wrapping wire is provided, the fretting caused by the wrapping wire is prevented and the durability of the cord can be further improved.

Figure 4:
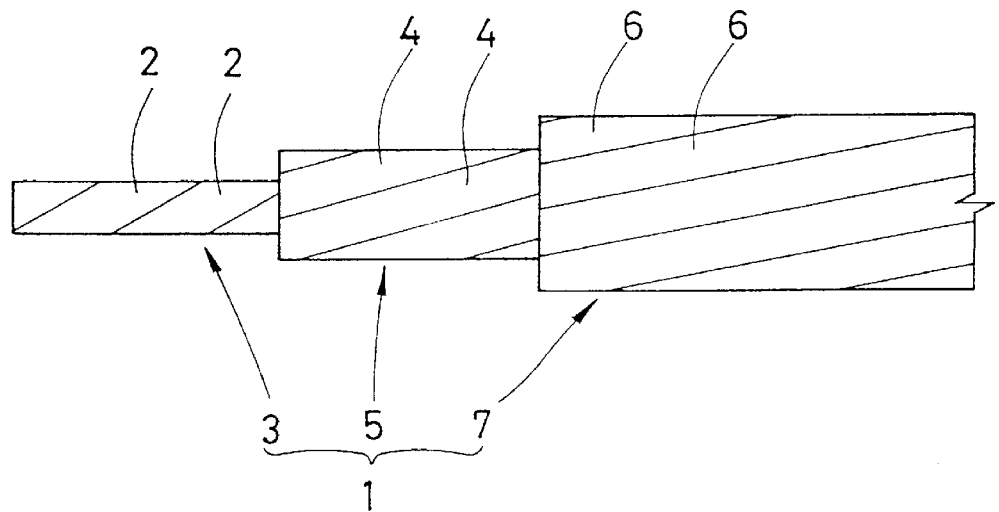
FIG. 4 is a schematic plan view of another embodiment of the present invention.
Figure 5:
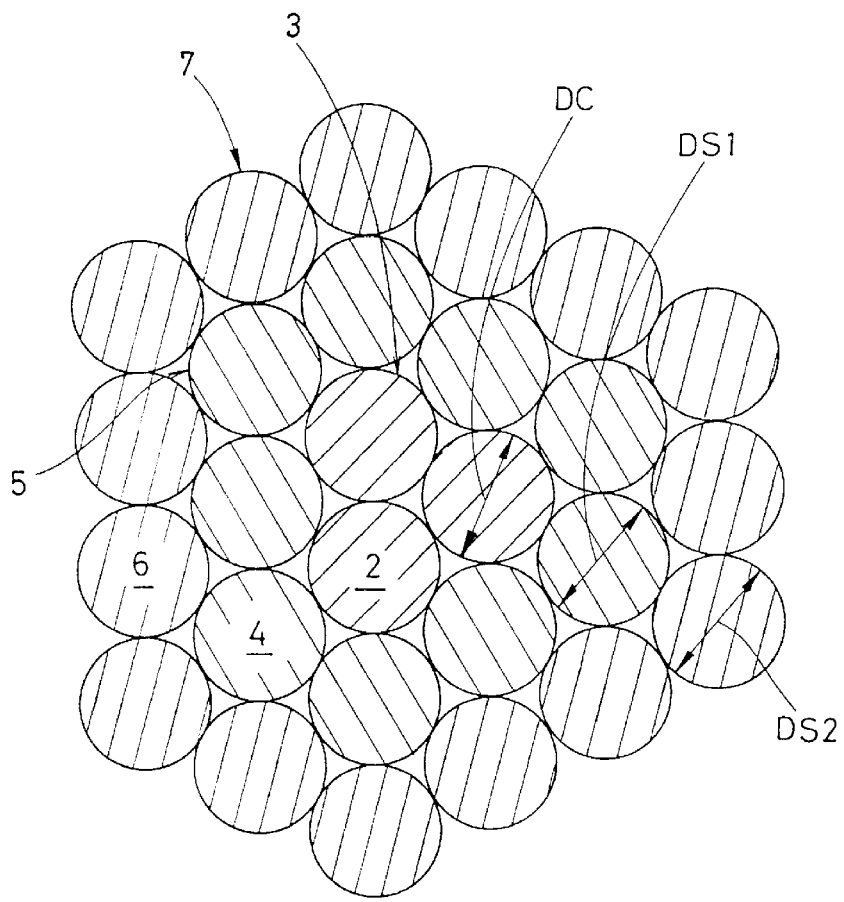
FIG. 5 is a cross sectional view of the embodiment of FIG. 4.

In FIGS. 4 and 5 showing another embodiment of the present invention, the tire cord 1 comprises the core 3 consisting of three core filaments 2 twisted together, the sheath 5 as an inner sheath consisting of seven to nine inner sheath filaments 4 twisted around the core 3, and an outer sheath 7 consisting of twelve to fifteen outer sheath filaments 6 twisted around the inner sheath 5. That is, the outer sheath is added to the basic structure in the former embodiment.

Each of the core filaments 2 and the inner and outer sheath filaments 4 and 6 is a single steel filament or wire made by drawing.

The diameter DC of the core filaments 2 is in the range of from 0.8 to 1.0 time the diameter DS1 of the inner sheath filaments 4.

The diameter DS1 of the inner sheath filaments 4 is the same as the diameter DS2 of the outer sheath filaments 6.

The diameters DC, DS1 and DS2 are in the range of from 0.20 to 0.40 mm.

In this embodiment, the inner sheath 5 is composed of nine filaments 4, and the outer sheath 7 is composed of fifteen filaments 6. The diameter of the core filaments DC is the same as the diameters DS1 and DS2 of the inner and outer sheath filaments 4 and 6. No wrapping wire is provided.

The core filaments 2, the inner sheath filaments 4, and the outer sheath filaments 6 are twisted in the same direction.

The twist pitch length P2 of the inner sheath 5 is in the range of from 1.05 to 1.50 times the twist pitch length P1 of the core 3 as explained above.

The twist pitch length P3 of the outer sheath 7 is in the range of from 1.05 to 1.50 times the twist pitch length P2 of the inner sheath 5.

As a small difference in twist pitch is provided between the core and the inner sheath and between the inner sheath and outer sheath, the inner sheath 5 rotates relative to the core 3 as explained above, and also, the outer sheath 7 rotates relative to the inner sheath 5.

Accordingly, in the same manner as the former embodiment, the cord arrangement is changed from a stable state to another stable state through an unstable state. In the stable portions, the filaments are compactly bundled to form a structure very close to a bundled twist cord. In the unstable portions, gaps are easily formed between the filaments and the rubber penetration is improved.

Further, as the twist pitch length P1 of the core 3, the twist pitch length P2 of the inner sheath 5, and the twist pitch length P3 of the outer sheath 7 satisfy the above-mentioned limitation, the core filaments 2 and the inner and outer sheath filaments 4 and 6 in the cord have the almost same length, and the load is almost evenly shared and the breaking strength of the cord is further improved.

If the twist pitch length difference is less than 1.05 times, the stress distribution becomes uneven, and the cord breaking strength decreases. If more than 1.50 times, it becomes difficult to fully control the occurrence of fretting, and the fatigue resistance is deteriorated.

If the filament diameter of the core is larger than the filament diameter of the sheath and the filament diameter of the inner sheath is not equal to the filament diameter of the outer sheath, the cord weight per cord diameter increases.

Figure 6:
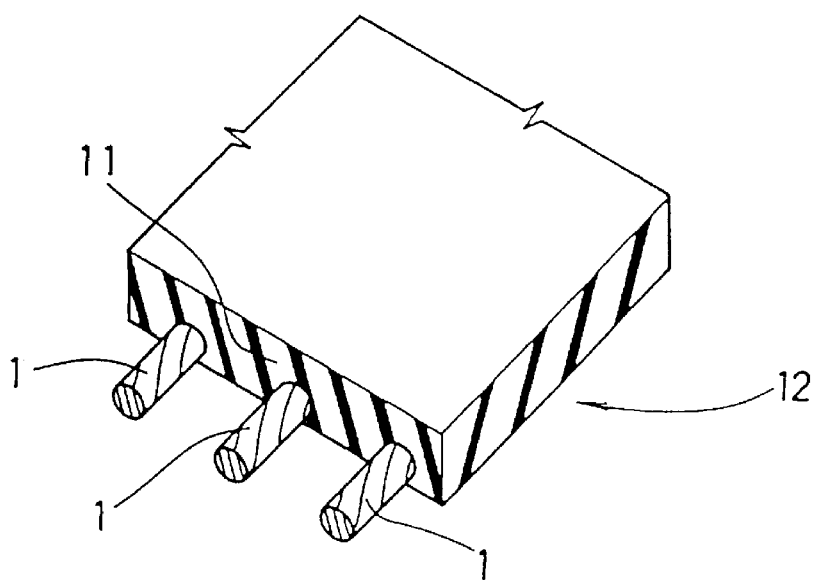
FIG. 6 is a schematic perspective view showing a cord reinforced rubber layer used in a tire.

The cords 1 constructed as above are used to reinforce a tire. The cords are laid parallel each other and rubberized with topping rubber 11 in a form of strip as shown in FIG. 6 and used as a carcass layer, belt layer, bead filler and the like.

Test Examples

Steel cords were made and tested as follows. The specifications thereof and test results are given in Table 1 and Table 2.

1) Rubber penetration test

First, a tire was made using the test cords, and then the cords were took out from the tire together with the surrounding topping rubber. The cords and rubber were put in toluene for 48 hours, and the swelled topping rubber was removed. The cord is disassembled into the individual filaments, and the percentage of the rubber-coated area thereof to the total area was measured along about a 5 cm length. Therefore, the higher the percentage, the better the rubber penetration.

2) Pull-out resistance test

This test was made as follows.

First, a tire was made, in which the test cords were embedded in parallel with each other as a reinforcing layer or ply, and then a test piece was removed from the tire.

Figure 7:
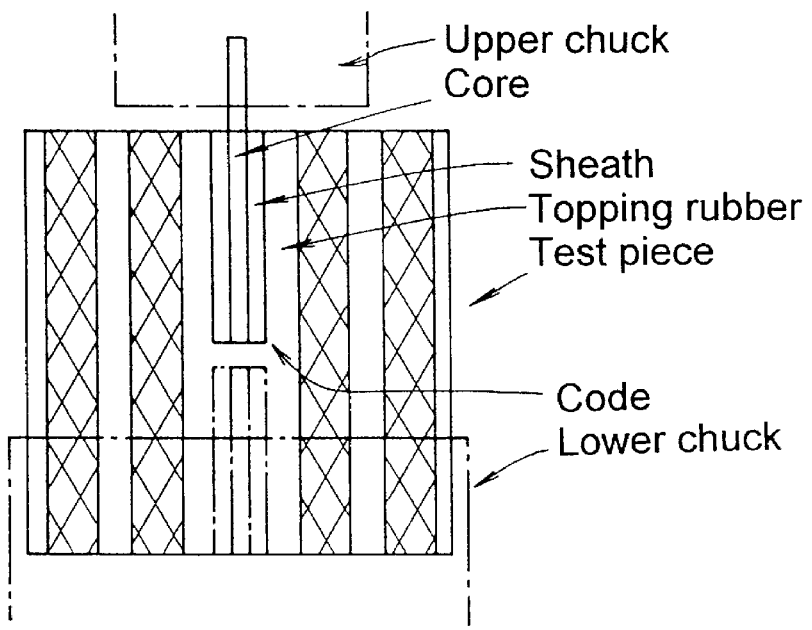
FIG. 7 is a diagram explaining a test method of measuring the pull-out resistance of the core.

Here, the test piece is, as shown in FIG. 7, a strip of topping rubber in which five parallel cords are disposed along the longitudinal direction. Therefore, the width thereof is substantially equal to five times the cord pitch. The length thereof is about 60 mm. Nothing protrudes from one end (the lower end in FIG. 7). From the other end (the upper end), however, only one core which is of the central cord protrudes. The central cord is cut at 15 mm from the upper end.

Holding the protruding core and the lower end of the test piece with an upper chuck and a lower chuck, a tensile force was applied therebetween and the force was gradually increased, as the result of which, when (1) the core was pulled out, (2) the core was cut, or (3) the topping rubber was broken between the target central cord and the adjacent cord, the tensile force was measured as the pull-out resistance. In each Table, the resistance is indicated by an index. The larger the index, the larger the pull-out resistance.

3) Fatigue resistance test

Heavy duty radial tires of size 10.00R20 14PR were made using the test cords in the carcass. The test tires were provided in the rear wheels of a 2-2D type truck and run for 150,000 kilometers. Then, the cords were removed from the tire and inspected to evaluate the fretting into five ranks as follows.

Figure 8:
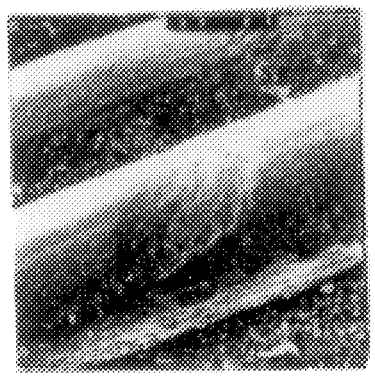
FIGS. 8(A), (B), (C), (D) and (E) shows ranks (A), (B), (C), (D) and (E) of fretting, respectively.
Figure 8:
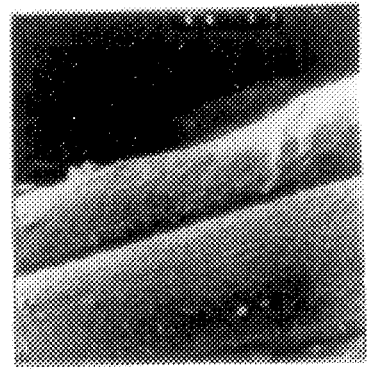
Figure 8:
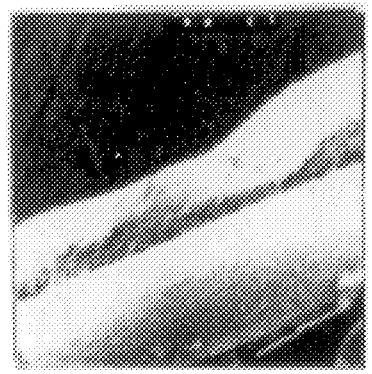
Figure 8:
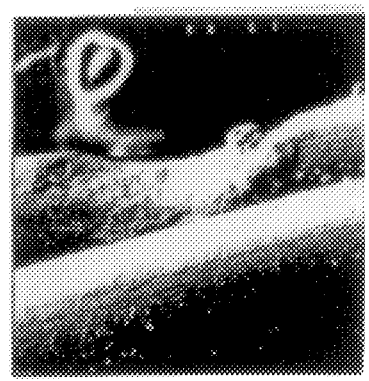
Figure 8:
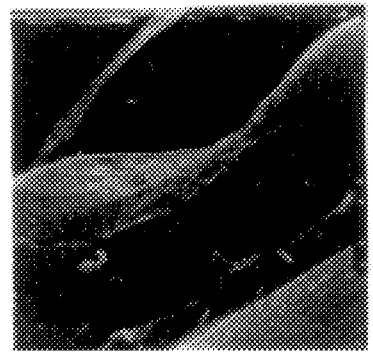

Rank 1: FIG. 8(A)—The surface of the filaments has a shallow fretting.

Rank 2: FIG. 8(B)—The fretting is under ¼ of the filament thickness.

Rank 3: FIG. 8(C)—The fretting is about ¼ of the filament thickness.

Rank 4: FIG. 8(D)—The fretting is about ¼ to ⅓ of the filament thickness.

Rank 5: FIG. 8(E)—The fretting is very deep and over ⅓ of the filament thickness.

From the tests, it was confirmed that the example cords according to the invention were superior to the reference cords in fatigue resistance, rubber penetration and core pull-out resistance although those cords were substantially of the same section area.

TABLE 1

|  | Ex. 1 | Ex. 2 | Ref. 1 | Ref. 2 | Ref. 3 | Ref. 4 | Ref. 5 | Ex. 11 | Ex. 12 |
|---|---|---|---|---|---|---|---|---|---|
| Cord structure *1 | 3 + 9 | 3 + 9 | 1 × 12 + W | 3 + 9 + W | 3 + 9 + W | 3 + 9 + W | 3 + 9 | 3 + 7 | 3 + 7 + W |
| Filament dia. |  |  |  |  |  |  |  |  |  |
| Core DC (mm) | 0.22 | 0.22 | 0.22 | 0.22 | 0.22 | 0.22 | 0.22 | 0.20 | 0.20 |
| Sheath DS (mm) | 0.22 | 0.22 | — | 0.22 | 0.22 | 0.22 | 0.22 | 0.22 | 0.22 |
| DC/DS | 1.0 | 1.0 | 1.0 | 1.0 | 1.0 | 1.0 | 1.0 | 0.91 | 0.91 |
| Twist pitch |  |  |  |  |  |  |  |  |  |
| Core PC (mm) | 14.2 | 10.05 | 12.5 | 14.5 | 9.4 | 6.0S | 9.4 | 12.0 | 6.0S |
| Sheath PS (mm) | 15 | 15 | — | 15 | 15 | 12.0S | 15 | 14.0 | 14.0S |
| PS/PC | 1.055 | 1.49 | 1.0 | 1.03 | 1.6 | 2.0 | 1.6 | 1.77 | 2.33 |
| Cord strength (kgf) | 112   113 | 109 | 110 | 115 | 115 | 115 | 103 | 106 |  |
| Rubber penetration (%) | 40 | 55 | 1 | 35 | 60 | 3 | 60 | 90 | 95 |
| Pull-out resistance | 2.1 | 2.2 | 1 | 2 | 2.3 | 2.5 | 2.3 | 13 | 28 |
| Fatigue resistance | <1 | <1 | 3.0 | 2.5 | 2.5 | 3.0 | 2.0 | <1 | 2.0 |

*1) W = Wrapping wire

TABLE 2

|  | Ex. 21 | Ex. 22 | Ex. 23 | Ref. 21 | Ref. 22 | Ref. 23 | Ref. 24 | Ref. 25 | Ref. 26 |
|---|---|---|---|---|---|---|---|---|---|
| Cord structure *1 | 3 + 9 + 15 | 3 + 9 + 15 | 3 + 7 + 13 | 1 × 27 + W | 3 + 9 + 15 + W | 3 + 9 + 15 + W | 3 + 9 + 15 + W | 7 × 4 | 3 + 7 + 13 + W |
| Filament dia. |  |  |  |  |  |  |  |  |  |
| Core DC (mm) | 0.22 | 0.22 | 0.20 | 0.22 | 0.22 | 0.22 | 0.22 | 0.22 | 0.20 |
| Inner sheath DS1 (mm) | 0.22 | 0.22 | 0.23 | — | 0.22 | 0.22 | 0.22 | — | 0.23 |
| Outer sheath DS2 (mm) | 0.22 | 0.22 | 0.23 | — | 0.22 | 0.22 | 0.22 | — | 0.23 |
| Twist pitch |  |  |  |  |  |  |  |  |  |
| Core P1 (mm) | 16 | 8 | 16 | 18 | 16 | 17 | 6 | 9.5 | 6 |
| Inner sheath P2 (mm) | 17 | 12 | 17 | — | 12 | 17.5 | 11 | 9.5 | 12 |
| Outer sheath P3 (mm) | 18 | 18 | 18 | — | 18 | 18 | 18 | 15.5 | 18 |
| P2/P1 | 1.06 | 1.50 | 1.06 | — | 0.75 | 1.03 | 1.83 | 1.00 | 2.00 |
| P3/P2 | 1.06 | 1.50 | 1.06 | — | 1.50 | 1.03 | 1.64 | 1.63 | 1.50 |
| Twist direction (core/in/out) | S/S/S | S/S/S | S/S/S | S | S/S/Z | S/S/S | S/S/S | S/S/Z | S/S/Z |
| Cord diameter (mm) | 1.35 | 1.35 | 1.31 | 1.47 | 1.61 | 1.35 | 1.35 | 1.55 | 1.57 |
| Section area (sq.mm) | 1.026 | 1.026 | 0.925 | 1.026 | 1.026 | 1.026 | 1.026 | 1.064 | 0.925 |
| Cord strength (kgf) | 260 | 263 | 235 | 240 | 265 | 242 | 264 | 265 | 240 |
| Rubber penetration (%) | 75 | 80 | 90 | 1 | 3 | 70 | 85 | 50 | 95 |
| Pull-out-resistance | 2.5 | 3.0 | 12 | 1 | 3.5 | 2 | 3.5 | 15 | 25 |
| Fatigue resistance | <1 | <1 | <1 | 3.0 | 3.0 | 2.5 | 2.5 | 2.5 | 2.5 |

*1) W = Wrapping wire

I claim:

1. A tire cord comprising a core, a first sheath and a second sheath surrounding the first sheath, wherein the core consists of three steel filaments twisted together, the first sheath consists of seven to nine steel filaments twisted around the core in the same direction as the core twist, the twist pitch length of the first sheath is in the range of from 1.05 to 1.50 times the twist pitch length of the core, the diameter of the core filaments is in the range of from 0.8 to 1.0 times the diameter of the first sheath filaments, the second sheath consists of twelve to fifteen steel filaments twisted around the first sheath in the same direction as the core twist, the twist pitch length of the second sheath is in the range of from 1.05 to 1.50 times the twist pitch length of the first sheath.

2. The tire cord according to claim 1, wherein the diameter of the first sheath filaments is equal to the diameter of the second sheath filaments.

3. The tire cord according to claim 2, wherein no wrapping wire is provided outside said second sheath.

4. The tire cord according to claim 1, wherein no wrapping wire is provided outside said second sheath.

* * * * *